United States Patent
Jürgen (10) Patent No.: US 10,512,858 B2
(45) Date of Patent: Dec. 24, 2019

(54) MEMBRANE PLATE, FILTER PLATE AND FILTER PRESS

(71) Applicant: STRASSBURGER FILTER GMBH & CO. KG, Westhofen (DE)

(72) Inventor: Sebastian Jürgen, Westhofen (DE)

(73) Assignee: STRASSBURGER FILTER GMBH & CO. KG, Westhofen (DE)

( * ) Notice: Subject to any disclaimer, the term of this patent is extended or adjusted under 35 U.S.C. 154(b) by 497 days.

(21) Appl. No.: 13/911,203

(22) Filed: Jun. 6, 2013

(65) Prior Publication Data
US 2013/0327723 A1   Dec. 12, 2013

(30) Foreign Application Priority Data

Jun. 6, 2012   (DE) .................. 10 2012 209 591

(51) Int. Cl.
*B01D 25/12*   (2006.01)
(52) U.S. Cl.
CPC .................. *B01D 25/122* (2013.01)
(58) Field of Classification Search
CPC .. B01D 25/215; B01D 25/285; B01D 25/164; B01D 25/122; B01D 25/176
USPC .................. 210/225, 230, 228, 767
See application file for complete search history.

(56) References Cited

U.S. PATENT DOCUMENTS

| | | | | |
|---|---|---|---|---|
| 1,450,560 A * | 4/1923 | Morton | ........... | B01J 20/06 210/181 |
| 2,710,294 A * | 6/1955 | Gerlough | ............. | C07K 14/765 424/530 |
| 3,608,734 A * | 9/1971 | Schneider | ........... | B01D 25/172 210/387 |
| 3,690,462 A * | 9/1972 | Kurita | ................ | B01D 25/127 210/225 |
| 4,052,314 A * | 10/1977 | Busse | ................ | B01D 25/215 210/230 |
| 4,235,721 A * | 11/1980 | Nakamura | ........... | B01D 25/215 210/227 |
| 4,397,061 A * | 8/1983 | Kanzaka | ............. | A44B 13/007 16/2.1 |

(Continued)

FOREIGN PATENT DOCUMENTS

CN   1711122 A   12/2005
DE   102 21 061 A1   11/2003

(Continued)

OTHER PUBLICATIONS

Dot Stables & Jean Rankin, Physiology in Childbearing 210 (3d ed., 2010) (Year: 2010).*

(Continued)

*Primary Examiner* — Krishnan S Menon
*Assistant Examiner* — Brad Gordon
(74) *Attorney, Agent, or Firm* — Hudak, Shunk & Farine Co. LPA (57) ABSTRACT

A membrane plate, a filter plate, and a filter press. The membrane plate is outfitted with a filter element on top of the membrane on both side surfaces, and the membrane plate has retaining elements at a distance from the margin on which the filter elements are removably secured. The filter plate also has retaining elements at a distance from the margin on which the filter elements are removably secured.

16 Claims, 11 Drawing Sheets

(56) References Cited

U.S. PATENT DOCUMENTS

| | | | | |
|---|---|---|---|---|
| 4,491,519 A * | 1/1985 | Kurita | B01D 25/127 | 210/225 |
| 4,608,164 A * | 8/1986 | Neu | B01D 25/215 | 210/231 |
| 4,666,596 A * | 5/1987 | Oelbermann | B01D 25/215 | 210/228 |
| 4,773,996 A * | 9/1988 | Endo | B01D 25/172 | 100/196 |
| 5,011,601 A * | 4/1991 | Busse | B01D 25/176 | 210/229 |
| 5,232,589 A * | 8/1993 | Kopf | B01D 25/215 | 210/228 |
| 5,599,446 A * | 2/1997 | Junker | B01D 25/001 | 210/230 |
| 5,851,387 A * | 12/1998 | Neumann | B01D 25/176 | 210/229 |
| 6,387,282 B1 * | 5/2002 | Heckl | B01D 25/215 | 210/770 |
| 6,596,230 B1 * | 7/2003 | Woo | A61L 2/0011 | 250/433 |
| 6,641,726 B1 * | 11/2003 | Sebastian | B01D 25/164 | 210/225 |
| 2004/0188336 A1 * | 9/2004 | Hermann | B01D 25/215 | 210/225 |
| 2005/0247616 A1 * | 11/2005 | Salbaum | B01D 25/285 | 210/224 |
| 2006/0180553 A1 * | 8/2006 | Pfeiffer | B01D 25/164 | 210/772 |
| 2008/0190831 A1 * | 8/2008 | Marchek | B01D 25/215 | 210/231 |
| 2008/0314814 A1 * | 12/2008 | Schuett | B01D 25/176 | 210/225 |
| 2010/0155344 A1 * | 6/2010 | Bonn | B01D 25/215 | 210/791 |

FOREIGN PATENT DOCUMENTS

| | | | | |
|---|---|---|---|---|
| DE | 102 52 922 B3 | | 5/2004 | |
| DE | 202005006536 U1 * | | 9/2006 | B01D 25/215 |
| DE | 102007037317 A1 * | | 3/2008 | B01D 25/164 |
| DE | 20 2007 008 649 U1 | | 11/2008 | |
| EP | 0603957 A1 * | | 6/1994 | B01D 25/176 |
| GB | 1223373 A * | | 2/1971 | B01D 25/176 |
| JP | 2104808 | * | 3/1985 | |
| JP | 1033133 Y2 * | | 10/1989 | |

OTHER PUBLICATIONS

Frank Meyeroltmanns and Matthias Grabosch, Downstream Ultrafiltration for Human Serum Albumin, 5 BioProcess International 56, 56 (2007). (Year: 2007).*

Gasper, H., Handbuch der industriellen Fest/Flussig-Filtration, Huthig-Verlag Heidelberg 1990, S. 104-111.

* cited by examiner

MEMBRANE PLATE, FILTER PLATE AND FILTER PRESS

FIELD OF THE INVENTION

The invention concerns a membrane plate, a filter plate, and a filter press with membrane plates, filter plates, and filter frames, and a use of the filter press.

BACKGROUND OF THE INVENTION

A filter press is a filtering device, and one distinguishes among so-called frame filter presses, chamber filter presses, and membrane filter presses. The same design of the filter press housing is involved, but it is outfitted with different kinds of plates (see, e.g., Horst Gasper "Handbook of industrial solid/liquid filtration", Hüthig-Verlag Heidelberg 1990, pp. 104-111).

Membrane filter presses with interchangeable membranes are known from this prior art for solid-liquid separation. Such filter presses can be used in various areas of application, such as waste water, chemistry, the food industry, metallurgy, pharmacy, and so on. Chamber filter presses have filtration chambers that are formed by specially shaped plates. Each chamber is provided with a membrane on at least one side. Thus, every second plate can be configured as a membrane plate covered with a membrane on both sides. When unfiltered product flows under pressure into the closed filter press, a filter cake is formed on each filtering means until the two layers of cake coalesce and the chambers are completely filled with solid. This first step of pressurized filtration is followed by a second step, press filtration.

During the press filtration, the elastic membranes are blown upon with a pressure medium, so that they expand and narrow the cake space. The cake embedded there is compressed, further decreasing the residual moisture content in the cavities of the cake. With the use of press filtration, extremely high filtration pressures can be avoided during the pressurized filtration, which leads to a cost savings.

DE 102 21 061 B4 discloses a plate arrangement in which filter plates and membrane plates are disposed alternatingly. The filter plate has a filter cloth on either side, which is secured in a recess of the base body of the filter plate. The membrane plate has a membrane on either side, being secured in a recess on either side of a base body of the membrane plate. A filter chamber is formed in the filter press between the one filter cloth of the filter plate and the membrane of the membrane plate. A pressure chamber is formed between the membrane and the base body of the membrane plate.

An additional filter cloth can be placed on top of the membrane plate on either side as the filter press is being assembled.

The filter cloths each extend as far as the margin of the filter and the membrane plates, where they are pressed against each other and thus held in place when the filter press is closed up. Because the filter cloths end at the margin of the plates, there is a risk of liquid dripping out from this region unless additional sealing elements are provided.

For the cleaning of the filter press, the filter press is opened and the filter cakes removed at the bottom. The individual filter and membrane plates are taken out and cleaned in a cleaning device located outside the filter press. Upon opening of the filter press, the filter cloths have to be removed and cleaned separately.

When filter layers are used in place of filter cloths, the filter layers have to be disposed of and replaced with new filter layers.

SUMMARY OF THE INVENTION

The problem of the invention is to create a filter press with membrane plates, filter plates and filter frames that is more cheap and that can be operated with less expense. Another problem of the invention is to provide such membrane plates and filter plates as parts of the filter press.

This problem is solved with a membrane plate for a filter press, wherein the membrane plate comprises a base body with two side surfaces and a margin, and a membrane of flexible material is arranged on the base body on either side, wherein the membrane plate is outfitted with a filter element on top of the membrane on the two side surfaces, and the membrane plate has retaining elements at a distance from the margin on which the filter elements are removably secured, a filter plate for a filter press, wherein the filter plate comprises a base body with two side surfaces and a margin, and a filter element is arranged on the base body on either side, wherein the filter plate has retaining elements at a distance from the margin on which the filter elements are removably secured, and a filter press for liquid, comprising a plurality of parallel arranged filter plates, filter frames, membrane plates and filter elements, wherein the filter plates and the membrane plates are outfitted with the filter elements on both sides and the plates have retaining elements at a distance from a margin at which the filter elements are removably secured.

The membrane plate is characterized in that it is outfitted with a filter element on top of the membrane on both side surfaces, and the membrane plate has retaining elements at a distance from the margin on which the filter elements are removably secured.

The filter plate is also characterized in that it has retaining elements at a distance from the margin on which the filter elements are removably secured.

The retaining elements are preferably arranged on the base body of the filter plate or the membrane plate.

In this way, it is possible to remove the filter plates and the membrane plates together with the filter elements of the filter press and deliver them to the cleaning device. It is not necessary to separate plates and filter element, so that both the cleaning process can be simplified and the disassembly and assembly of the filter and membrane plates can be significantly shortened. The benefit of the filter and membrane plates is that the plates can be cleaned with the filter cloths, the filter cloths can be used several times, and the assembling of the filter press can be done in less time, because the filter cloths do not need to be installed and secured separately.

By "plates" is meant both filter plates and membrane plates.

The retaining elements are distributed on the side surfaces of the plates in the margin region, so that the filter element is retained all around.

Preferably, the filter element is a filter cloth. Filter cloths can be fastened by means of the retaining elements in a stretched state on the respective plate.

Preferably, the retaining elements project relative to the side surface of the base body of the plate. The retaining elements preferably extend perpendicular to the plane E, E' of the respective plate. The planes E, E' lie in the side surfaces of the base body adjacent to the margin of the respective plate. The advantage is that the filter cloth or filter element can be easily suspended from the retaining elements.

The filter elements preferably have holes in which the retaining elements can be inserted. This facilitates the disassembly of the used filter elements and the installing of new filter elements.

The retaining elements are preferably retaining pegs, pins or knobs. Such retaining elements can be prefabricated and then installed in prearranged boreholes in the base body of the plate.

The retaining pegs preferably have a truncated cone section. The truncated cone section tapers toward the free end of the retaining peg, which simplifies the introducing of the retaining peg in the hole of the filter element.

Preferably, an undercut is provided on the retaining peg between the truncated cone section and the side surface of the base body of the plate. After the filter element is installed, the margin of the hole of the filter element engages behind the undercut, so that the filter element is held securely and cannot be detached from the membrane or filter plate even during the cleaning process.

The undercut is preferably formed by an annular groove in the retaining peg. Such an encircling undercut improves the fixation of the filter element.

The cut piece of filter element is preferably smaller than the plate dimensions, so that the margin of the filter element is set back from the margin of the plate. This means that the surface of the filter element is smaller than the side surface of the respective plate. The cut piece of membrane, which consists of an elastic material such as rubber, is smaller than the cut piece of the filter element, so that the filter element entirely covers the membrane.

Because the cut piece of filter element is smaller than the plate dimensions, the filter element does not reach to the margin of the plate, so that leakage is avoided. When assembled, the margin regions of the base bodies of the plates can be pressed against each other. There is no need for extra cleaning work or catching of any dripping liquid.

Preferably, the base bodies of the plates have an encircling annular groove in the side surfaces. This annular groove is at a distance from the margin of the plate and adapted to the cut piece of filter element.

The filter element is preferably dimensioned such that the margin of the filter element lies in the annular groove. This further improves the seal in the margin region of the plates, without having to use additional sealing elements. In particular during blood filtration, it is advantageous for hygienic reasons to use as few sealing elements as possible or even no elements.

The plates are constructed such that the filter elements with a thickness D stick out only slightly relative to the planes E, E'. Between a recess for the membrane and an annular groove in which the margin of the filter element lies the base body of the plate is set back by an amount which is less than or equal to the thickness D of the filter element.

The filter press of the invention has a plurality of parallel arranged filter plates, filter frames and membrane plates, the filter plates and the membrane plates being outfitted with the filter elements on both sides and the plates having retaining elements at a distance from the margin at which the filter elements are removably secured.

The plate arrangement preferably calls for the following sequence: . . . filter plate, filter frame, membrane plate, filter frame, filter plate, and so on . . . This is a periodic arrangement, with the periodicity consisting of the sequence filter plate, filter frame, membrane plate, filter frame.

Through the eyelets provided in the plates and frames, unclean liquid is supplied and filtrate is drained off. Unclean liquid is introduced into the respective unclean liquid spaces through the filter frame and from here it is pressed through the filter elements provided on both sides of the unclean liquid space. The filtrate is drained off both across the filter plates and across the membrane plates and taken out through the respective eyelets in the plates.

Preferably, the filter frames have holes at a distance from the margin. These holes are distributed in a ring around the margin region and serve to receive the ends of the retaining elements of the filter plates and the membrane plates when the filter press is assembled.

When the retaining peg has a truncated cone configuration, it is necessary for the truncated cone section to be taken up in the holes of the filter frame.

The holes are preferably continuous holes, so that the retaining elements can engage in the holes from both sides.

The cut piece of filter element is preferably chosen such that it also extends across the region of the eyelets of the plates. The eyelets are preferably provided with an annular bulge, which likewise has an undercut, preferably in the shape of an annular groove. The filter elements have corresponding holes in this region, so that the filter elements are retained also in the region of the eyelets. This further improves the fastening of the filter elements on the plates.

Advantageously, the filter press is used for the filtration of blood plasma and for the manufacturing of pharmaceutical products.

BRIEF DESCRIPTION OF THE DRAWINGS

Sample embodiments of the invention shall be explained more closely below by means of the drawings.

There are shown.

DETAILED DESCRIPTION OF THE INVENTION

Figure 1:
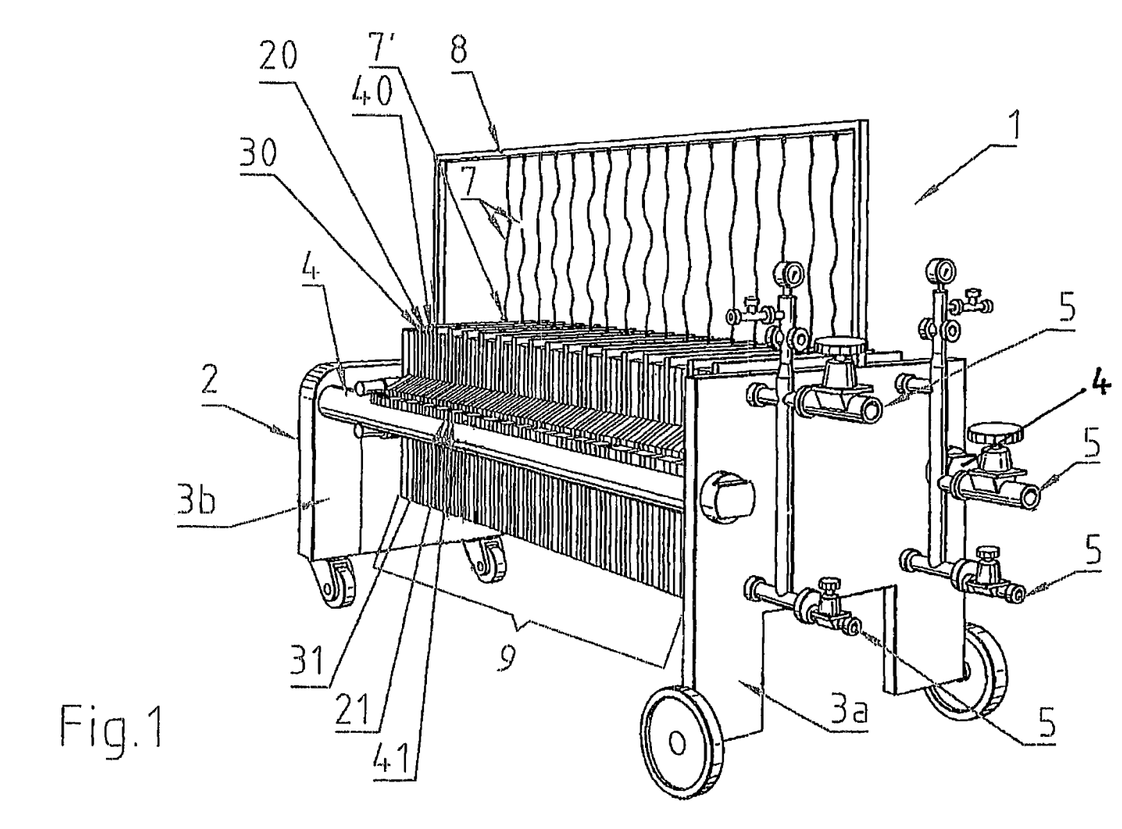
FIG. 1, a perspective representation of a filter press.

FIG. 1 shows a filter press 1 in perspective view. The filter press 1 has a movable housing 2, which has a housing plate 3a, 3b at either end, being joined together by two support beams 4. On these support beams 4, the filter plates 40, the filter frames 20 and the membrane plates 30 are hung in a predetermined sequence to form a plate arrangement 9 by their support lugs 21, 31, 41 and pressed tightly together by a pressing device. The membrane plates 30 have pressurized air ports 7', to which hoses 7 are attached, which are led by a rod 8 to a common pressurized air supply (not shown).

In the front part of the housing there are several connection ports 5 for intake of unclean liquid and draining of filtrate, which are connected by the filtrate and unclean liquid channels situated inside the plate arrangement 9. To form these filtrate and unclean liquid channels, appropriately dimensioned eyelets 28, 38, 48 are provided in the plates 30, 40 and in the filter frame 20 at the corners.

Figure 2:
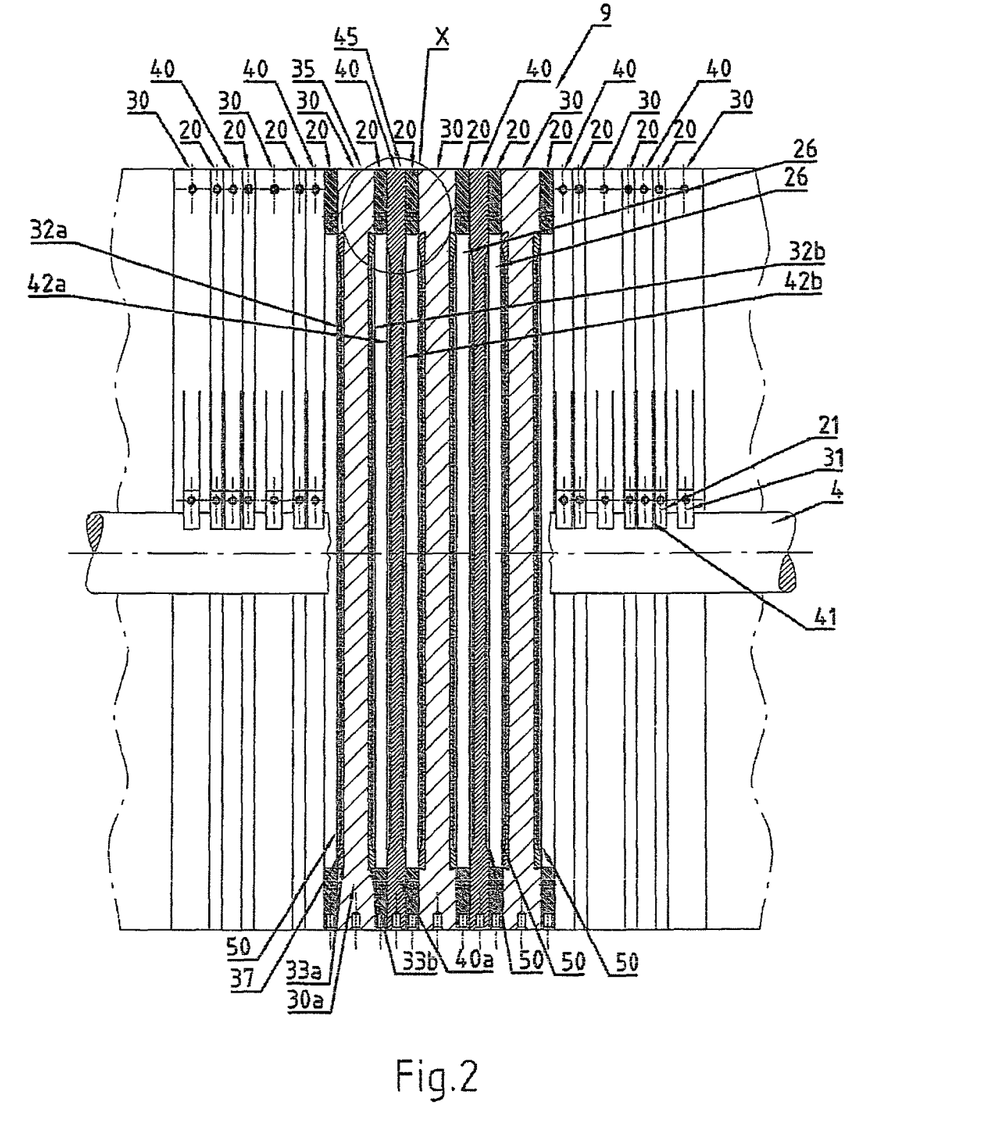
FIG. 2, a cutout detail from the filter plate arrangement of FIG. 1, partly in vertical section and partly in side view, FIG. 3, the region indicated by X in FIG. 2 in a magnified view, FIG. 4, the region indicated by Y in FIG. 3 in a magnified view, FIG. 5, a perspective top view of a membrane plate with filter cloth partly folded back, FIG. 6, a top view of a membrane plate without filter element, FIG. 7, a section through the membrane plate shown in FIG. 6 along line A-A in a magnified view and with filter element, FIG. 8, a top view of a filter plate without filter element, FIG. 9, a section along line B-B in FIG. 8 in magnified view with filter element, FIG. 10, a top view of a filter frame, and FIG. 11, a magnified view of the lower left corner of the filter frame per FIG. 10.

FIG. 2 shows a cutout detail of a plate arrangement 9, magnified and partly shown in sectional view. One notices that membrane plates 30 and filter plates 40 are arranged in alternation, with a filter frame 20 being disposed each time between the plates 30, 40.

The membrane plate 30 has a base body 30a, which has a recess 37 on each of its two side surfaces 32a, 32b, in which the membranes 33a, 33b are inserted. The base body 30a of the membrane plate 30 preferably consists of plastic, so that the membranes 33a, 33b can be heat sealed there.

Filter elements 50 in the form of filter cloths are stretched over the membranes 33a, 33b, the cut piece of filter cloth being smaller than the dimensions of the membrane plate 30. This also holds for the filter plate 40, which likewise carries a filter cloth 50 on its two side surfaces 42a, 42b.

Due to the smaller dimensioning of the filter cloths 50, these do not stand out past the margins 35, 45 of membrane plate 30 and filter plate 40. The details shall be discussed in connection with FIGS. 3 to 7, while FIG. 3 shows a magnified view of the market feature X.

The details of the filter plates 40 will be discussed in connection with FIGS. 8 and 9.

Each time filter frames 20 are arranged between the membrane and filter plates 30, 40, bounding the unclean liquid space 26. These shall be described in detail in connection with FIGS. 10 and 11.

Figure 3:
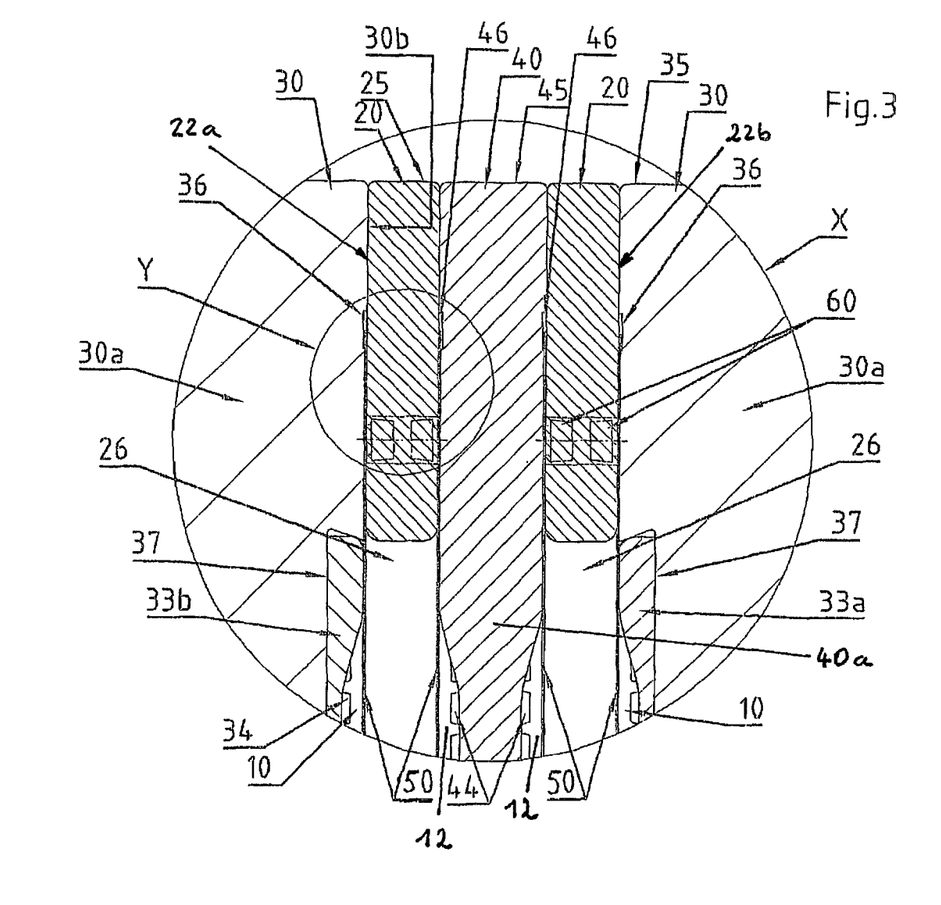

FIG. 3 shows a magnified view of the region marked X, showing the arrangement of membrane plate 30 with base body 30a, filter frame 20, filter plate 40 with base body 40a, filter frame 20, and another membrane plate 30.

The membranes 33a and 33b of the membrane plate 30 have a thickness in their margin region that corresponds to the depth of the recess 37 of the base body 30a of the membrane plate 30. The cross section of the membrane 33a, 33b tapers inward from the margin, so that a filtrate space 10 is created between the surface of the membranes 33a, 33b, which is provided with knobs 34, and the filter element 50, in which the filtrate collects and is then drained off through corresponding channels (not shown) in the membrane plate 30 via the eyelets 38.

The membrane plate has an annular groove 36 at a distance from the margin 35, in which the filter element 50 terminates. The margin 55 of the filter element 50 lies in the middle of the groove 36, the term "middle" also referring to the width of the groove 36 (see FIG. 4).

Figure 4:
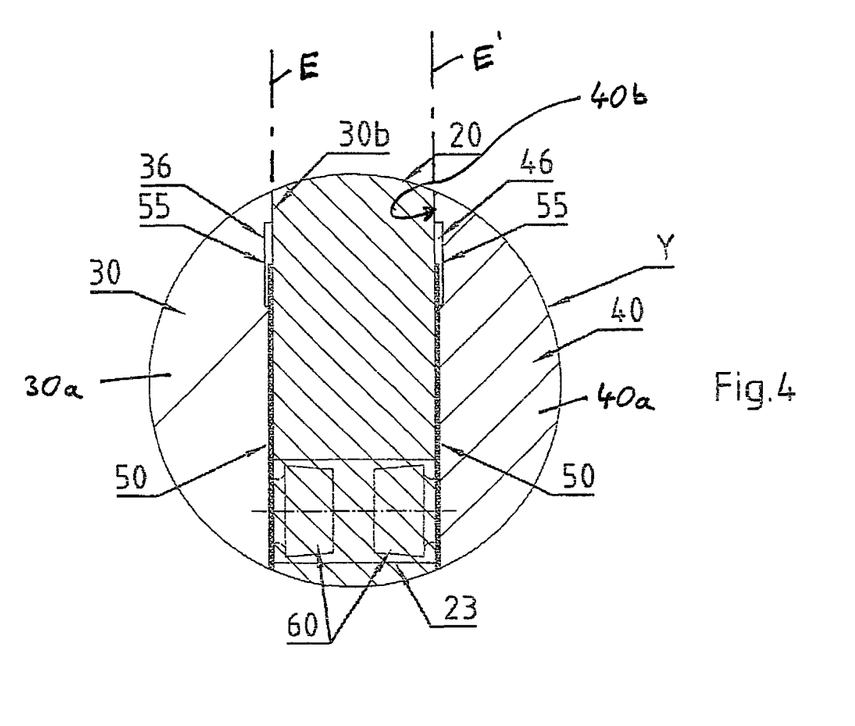
Figure 7:
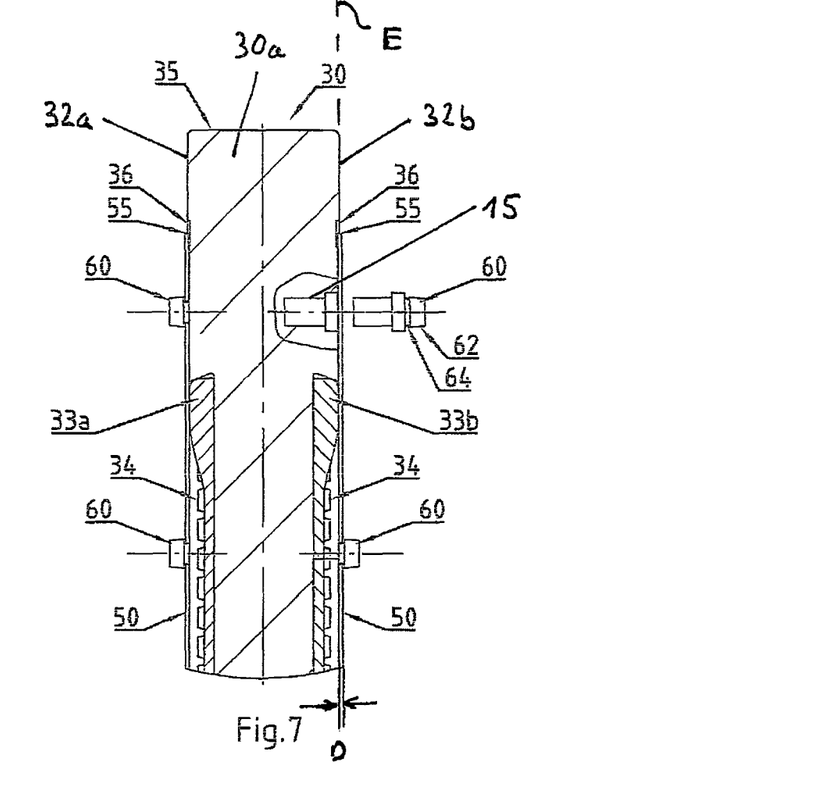

As can be seen in FIG. 3 and especially in FIG. 4, the outer surface of the filter element 50 lies in the plane E of the margin surface 30b of the base body 30a of the membrane plate 30 in the assembled state. Between the recess 37 for the membranes 33a, 33b and the annular groove 36, the outer surface of the base body 30a of the membrane plate 30 is set back by an amount that is less than or equal to the thickness D of the filter element 50. When assembled, the filter element is only slightly compressed. In FIG. 7, which shows the membrane plate before being installed, one notices that the filter element 50 stands off from the plane E by roughly half the thickness of the filter element. This ensures that the filter element 50 lies flush and the filter frame 20 and the margin surface 30b of the membrane plate 30 lie directly one on the other and can be pressed together, so that an optimal sealing is achieved here. The annular groove 36 is deeper than the thickness of the filter element 50 relative to the margin surface 30b, which has the advantage that the margin 55 of the filter element 50 is not compressed. Any liquid escaping from the filter element 50 is trapped in the annular groove 36.

The filter plate 40 is configured identically to the membrane plate 30 as regards the annular groove 46 in the base body 40a and as regards the arrangement of the filter element 50. The outer surface of the filter element 50 in the assembled state likewise lies in a plane E' of the margin surface 40b of the base body 40a. In the region of the base body 40a that is essentially opposite the unclean liquid space 26 of the filter frame 20, the thickness of the base body 40 is reduced and provided with knobs 44. Between the base body 40a of the filter plate 40 and the filter element 50 there is likewise formed a free space, i.e., a filtrate space 12, in which the filtrate collects and is then drained away.

The filter frame 20 has holes 23 in the side surfaces 22a, b in the form of continuous boreholes 23, which will be further described below, and which engage with the retaining elements 60 of membrane plate 30 and filter plate 40 (broken line in FIG. 4).

Figure 5:
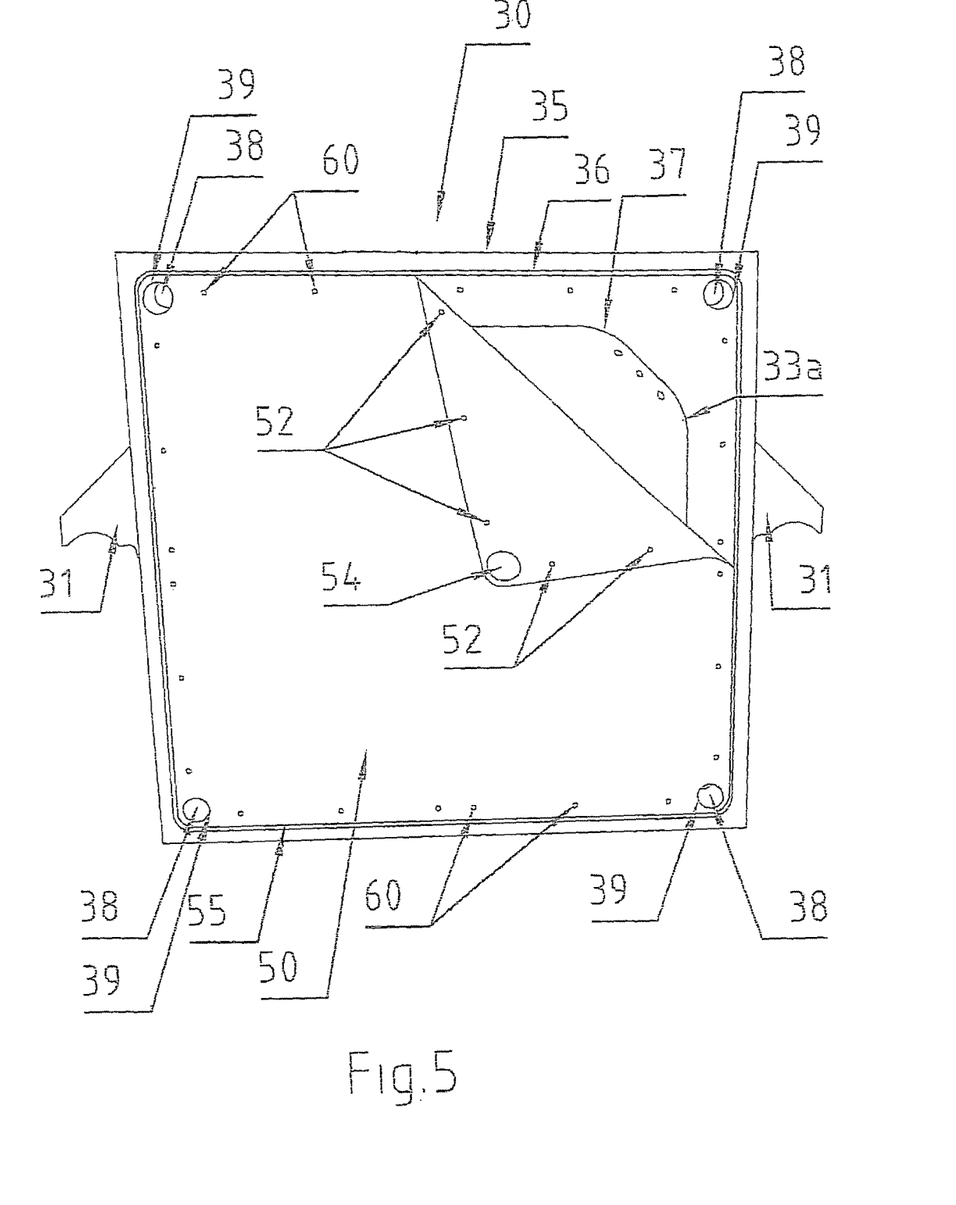

FIG. 5 shows a top view (in perspective) of a membrane plate 30, such that the retaining elements 60 can be seen, these having the configuration of a retaining peg (see FIG. 7). These retaining elements 60, which are shown only schematically in FIG. 5, are arranged at a distance from the margin 35 and lie essentially in the region of the line connecting the eyelets 38 situated in the corner regions of the membrane plate 30.

The filter cloth 50, which is partly folded back, has corresponding holes 52, through which the retaining pegs 60 can be inserted. Moreover, one can see that the membrane 33a lies in a recess 37, while the cut piece of membrane 33a is smaller than the cut piece of filter cloth 50.

The eyelets 38 are provided with annular bulges 39, which likewise have an undercut, preferably in the form of an annular groove, which cannot be seen in FIG. 5. The filter cloth 50 has correspondingly sized holes 54 in the corner regions, which can be shoved across the annular bulges 39, so that the filter cloth can likewise be fastened removably at the corner regions.

Figure 6:
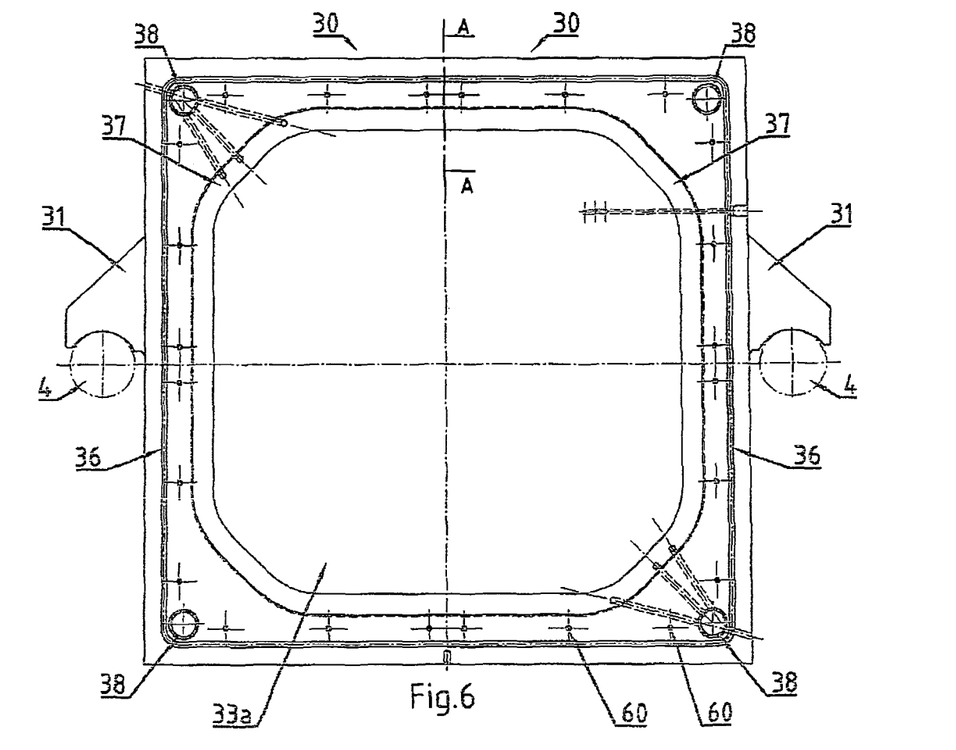

FIG. 6 shows a top view of a membrane plate 30, the filter cloth 50 not being shown.

FIG. 7 shows a section along line A-A of FIG. 6, this region being shown magnified. The retaining elements 60 are retaining pegs, which are disposed on the two side surfaces 32a, 32b of the base body 30a and which have a truncated cone section 62, which is located at the free end of the retaining peg 60. At the lower end of the truncated cone section 62 is disposed an undercut 64 in the form of an annular groove. The retaining pegs 60 extend perpendicular to the plane E of the membrane plate 30 and are inserted into boreholes 15. At the left side of FIG. 7, the retaining peg 60 is shown in the installed state and one can see that the width of the undercut 64 is attuned to the thickness D of the filter element 50, so that it can reach behind the truncated cone section 62 and become fixed there.

Figure 8:
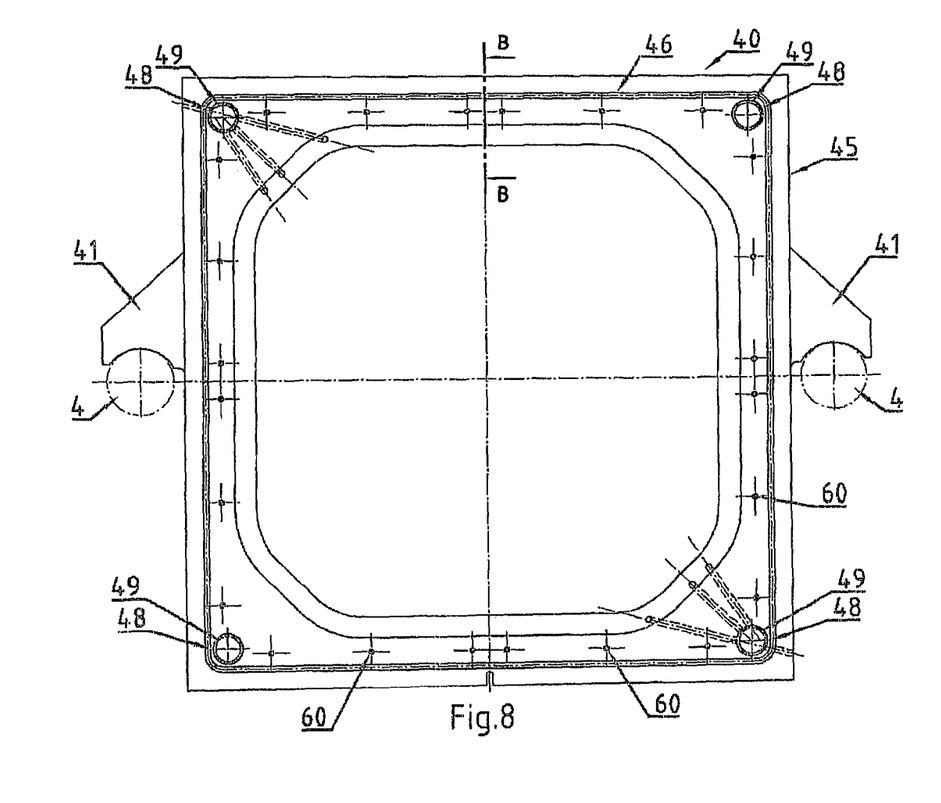

FIG. 8 shows a filter plate 40 that is configured in the same way as the membrane plate 30 and that likewise has retaining elements 60 arranged at a distance from the margin 45. Here as well an annular groove 46 is provided, in which the filter element 50 terminates. The configuration of the annular groove 46 corresponds to that of the annular groove 36. Moreover, eyelets 48 with annular bulges 49 are provided, being provided with an undercut similar to the annular bulges 39.

Figure 9:
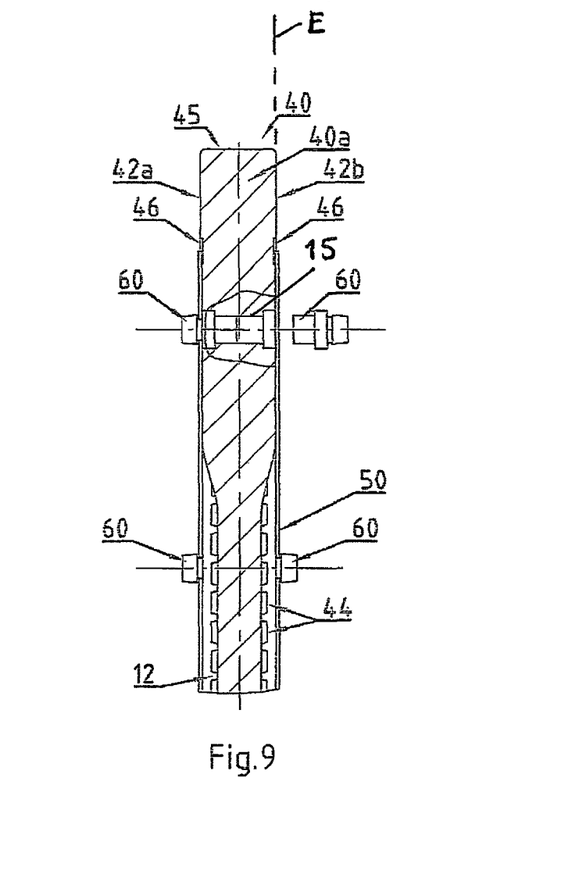

As is shown in FIG. 9, the retaining elements 60 are likewise arrange on both side surfaces 42a, 42b of the base body 40a. The retaining elements 60 are likewise inserted in boreholes 15 of the base body 40a.

A filtrate space 12 is formed between the filter elements 50 and the region of the base body 40a that is provided with knobs 44. The filter element 50—as in the case of the membrane plate 30—stands off slightly from the plane E'.

Figure 10:
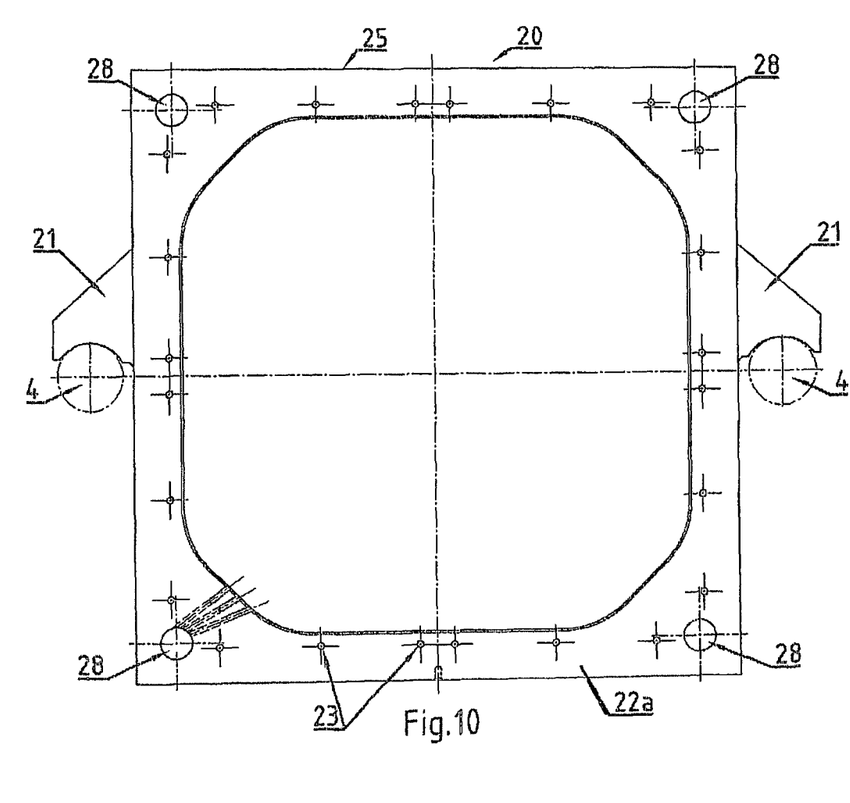

FIG. 10 shows a filter frame 20 with margin 25, which has a row of holes 23 in the side surface 22a, with which the retaining elements 60 can engage on either side when the unit is assembled (also see FIG. 3).

Figure 11:
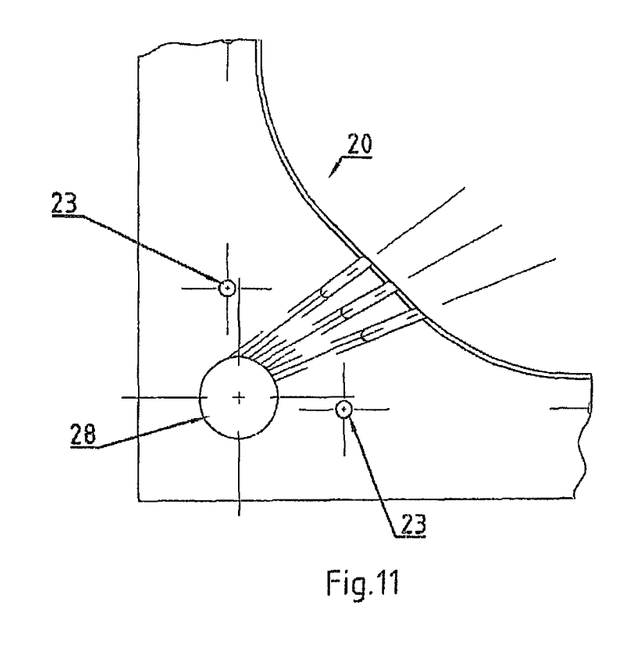

FIG. 11 shows a magnified view of the lower left corner with eyelet 28 and two holes 23.

LIST OF REFERENCE NUMBERS 1 filter press
2 housing
3a, b housing plate
4 support beams
5 connection port
7 pressurized air hose
7' pressurized air port
8 rod
9 plate arrangement
10 filtrate space (membrane plate)
12 filtrate space (filter plate)
15 borehole
20 filter frame
21 support lug
22a, 22b side surface of filter frame
23 hole
25 margin
26 unclean liquid space
28 eyelet
30 membrane plate
30a base body
30b margin surface
31 support lug
32a, 32b side surface of membrane plate
33a, 33b membrane
34 knob
35 margin
36 annular groove
37 recess
38 eyelet
39 annular bulge
40 filter plate
40a base body
40b margin surface
41 support lug
42a, 42b side surface of filter plate
44 knob
45 margin
46 annular groove
48 eyelet
49 annular bulge
50 filter element
52 hole
54 hole
55 margin
60 retaining element, retaining peg
62 truncated cone section
64 undercut
E plane of membrane plate
E' plane of filter plate
D thickness of filter element

What is claimed is:

1. A membrane plate for a filter press, wherein the membrane plate comprises: a base body with two side surfaces and a margin, and a membrane of flexible material which is arranged on the base body on both of the two side surfaces, wherein the membrane plate is outfitted with two filter elements on top of the membrane plate such that one of said two filter elements is on one of said two side surfaces and the other of said two filter elements is on the other side surface, and the membrane plate has retaining elements located in a margin region at a distance from the margin, wherein the filter elements are removably secured on the retaining elements, wherein the retaining elements are arranged on the base body of the membrane plate, wherein the retaining elements are arranged outside a perimeter of the membrane, wherein the retaining elements extend perpendicular to planes E, E' of the membrane elate, wherein planes E, E' lie in the side surfaces of the base body with the planes E, E' adjacent to the margin of the membrane plate, wherein the retaining elements are retaining pegs, wherein each of the retaining pegs has a truncated cone section, and wherein an undercut is provided on each retaining peg between the truncated cone section and one of the two side surfaces of the base body of the membrane plate.

2. A filter plate for a filter press, wherein the filter plate comprises: a base body with two side surfaces and a margin, and two filter elements arranged on the base body such that one of said two filter elements is on one of said two side surfaces and the other of said two filter elements is on the other side surface, wherein the filter plate has retaining elements located in a margin region at a distance from the margin, wherein the filter elements are removably secured on the retaining elements, wherein the retaining elements are arranged on the base body of the filter plate, wherein the retaining elements project outwardly relative to both side surfaces of the base body of the filter plate and extend perpendicular to two planes E, E' of the filter plate, wherein planes E, E' lie in the side surfaces of the base body with the planes E, E' adjacent to the margin of the filter plate, wherein the filter elements have holes in which the retaining elements can be inserted, wherein the filter elements are filter cloths, wherein the retaining elements are retaining pegs, wherein each of the retaining elements has a truncated cone section, and wherein an undercut is provided on each of the retaining elements between the truncated cone section and one of the two side surfaces of the base body of the filter plate.

3. The plate according to claim 1, wherein each of the filter elements is a filter cloth.

4. The plate according to claim 1, wherein the retaining elements project outwardly relative to one of the two side surfaces of the base body of the plate.

5. The plate according to claim 1, wherein the filter elements have holes in which the retaining elements can be inserted.

6. The plate according to claim 1, wherein each of the filter elements has a margin and the membrane plate has a size, and wherein each of the filter elements is smaller in size than the size of the membrane plate, so that the margin of the each of the filter elements is set back from the margin of the membrane plate.

7. The plate according to claim 1, wherein the base body of the membrane plate has an encircling annular groove in each of the side surfaces.

8. The plate according to claim 7, wherein the filter elements are dimensioned such that the margins of one filter element lie in one annular groove.

9. A filter press for liquid, comprising a plurality of parallel arranged: a) filter plates, b) filter frames, c) membrane plates and d) filter elements, wherein each filter plate comprises a base body with two side surfaces and a margin, two planes E, E', and two filter elements which are arranged on the base body such that one of said two filter elements is on one of said two side surfaces and the other of said two filter elements is on the other side surface, wherein each filter plate has a margin region and has retaining elements located in the margin region, the retaining elements being located at a distance from the margin, wherein the filter elements are removably secured on the retaining elements, wherein the retaining elements are arranged on the base body of the filter plate, wherein the retaining elements project outwardly relative to both side surfaces of the base body and extend perpendicular to the two planes E, E', wherein the planes E, E' lie in the side surfaces of the base body with the planes E, E' adjacent to the margin of the filter plate, wherein the filter elements have holes in which the retaining elements can be inserted wherein the filter elements are filter cloths, wherein the retaining elements are retaining pegs, wherein each of the retaining elements has a truncated cone section, and wherein an undercut is provided on each of the retaining elements between the truncated cone section and one of the two side surfaces of the base body of the plate; and each membrane plate comprises a base body with two side surfaces and a margin, and a membrane of flexible material which is arranged on the base body of the membrane plate on either of the two side surfaces of the membrane plate, wherein each membrane plate is outfitted with two filter elements such that one of said two filter elements of said membrane plate is on one of said two side surfaces of said membrane plate and the other of said two filter elements of said membrane plate is on the other side surface of said membrane plate, wherein each membrane plate has a margin region and has retaining elements located in the margin region, the retaining elements being located at a distance from the margin, wherein the filter elements of the membrane plate are removably secured on the retaining elements, wherein the retaining elements of the membrane plate are arranged on the base body of the membrane plate, wherein the retaining elements of the membrane plate are arranged outside of a perimeter of the membrane, wherein the retaining elements of the membrane plate are retaining pegs, wherein each of the retaining elements of the membrane plate has a truncated cone section, and wherein an undercut is provided on each of the retaining elements of the membrane plate between the truncated cone section and one of the two side surfaces of the base body of the membrane plate.

10. The filter press according to claim 9, wherein at least one of the plurality of filter frames has holes at a distance from the margin of one of the filter plates.

11. A method comprising the steps of: filtering blood plasma with the filter press according to claim 9 by introducing unfiltered blood plasma to the filter press, pressing the blood plasma through the filter elements and draining filtrate off of the press.

12. The plate according to claim 2, wherein the retaining elements extend perpendicular to the two planes E, E' of the plate, and wherein the retaining elements are retaining pegs.

13. The plate according to claim 2, wherein the filter elements are smaller in size than the plate dimensions, so that the margin of each of the filter elements is set back from the margin of the filter plate, wherein the base body of the filter plate has an encircling annular groove in each of the two side surfaces, and wherein the margin of one of the filter elements lies in one of the annular grooves and the margin of the other filter element lies in the other annular groove.

14. The plate according to claim 1, wherein the membrane plate includes eyelets situated in corner regions of the membrane plate, and wherein the retaining elements lie essentially in a region of a line connecting the eyelets.

15. The plate according to claim 2, wherein the filter plate includes eyelets situated in corner regions of the filter plate, and wherein the retaining elements lie essentially in a region of a line connecting the eyelets.

16. the plate according to claim 9, wherein the membrane plate includes eyelets situated in corner regions of the membrane plate, wherein the retaining elements lie essentially in a region of a line connecting the membrane plate eyelets, wherein the filter plate includes eyelets situated in corner regions of the filter plate, and wherein the retaining elements lie essentially in a region of a line connecting the filter plate eyelets.

* * * * *

UNITED STATES PATENT AND TRADEMARK OFFICE
CERTIFICATE OF CORRECTION

| | | |
|---|---|---|
| PATENT NO. | : 10,512,858 B2 | Page 1 of 1 |
| APPLICATION NO. | : 13/911203 | |
| DATED | : December 24, 2019 | |
| INVENTOR(S) | : Sebastian Jürgen | |

It is certified that error appears in the above-identified patent and that said Letters Patent is hereby corrected as shown below:

In the Claims

In Claim 1, Column 8, Line 23, delete "elate" and replace with -- plate --.

Signed and Sealed this
Seventeenth Day of March, 2020

Andrei Iancu
*Director of the United States Patent and Trademark Office*